(12) United States Patent  (10) Patent No.: US 7,978,374 B2
Kawara  (45) Date of Patent: Jul. 12, 2011

(54) PRINTING SYSTEM TO OPTIMIZE PRINTING WORKFLOW

(75) Inventor: Satoshi Kawara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 11/531,391

(22) Filed: Sep. 13, 2006

(65) Prior Publication Data
US 2007/0070412 A1 Mar. 29, 2007

(30) Foreign Application Priority Data
Sep. 29, 2005 (JP) ................................. 2005-283295

(51) Int. Cl.
H04N 1/40 (2006.01)

(52) U.S. Cl. ....... 358/3.28; 358/1.9; 358/1.11; 712/226; 712/245; 715/269

(58) Field of Classification Search .................. 358/1.15, 358/1.6, 1.9, 3.28, 1.11, 505; 715/269, 273, 715/201, 204, 225, 226, 245; 712/245, 201, 712/204, 225, 226
See application file for complete search history.

(56) References Cited

U.S. PATENT DOCUMENTS

| 5,528,742 | A | * | 6/1996 | Moore et al. | 715/205 |
| 5,737,599 | A | * | 4/1998 | Rowe et al. | 707/10 |
| 2003/0007703 | A1 | * | 1/2003 | Roylance | 382/303 |

FOREIGN PATENT DOCUMENTS

| JP | 2004-246501 A | 9/2004 |
| JP | 2004246501 A | * | 9/2004 |

* cited by examiner

Primary Examiner — King Y Poon
Assistant Examiner — Jamares Washington
(74) Attorney, Agent, or Firm — Canon USA Inc. IP Division

(57) ABSTRACT

In print processing performed for a print document based on a print instruction that instructs plural processes applied to the print document, a process that uses resource information embedded in the print document is identified among the plural processes instructed by the print instruction. Then, a process for embedding the resource information into the print document is performed before starting the identified process.

7 Claims, 16 Drawing Sheets

| NAME OF IMAGE PROCESSING DEVICE | PROCESSING PERFORMED IN EACH DEVICE |
|---|---|
| 104-A | COLOR MANAGEMENT |
| 104-B | TRAPPING<br>SCREENING<br>SMOOTHING |
| 104-C | TILING<br>IMPOSITION<br>PREVIEW<br>RENDERING |
| 104-D | PRINTING |

FIG. 7

```
1   <JobTicket>
2       <Process="ColorManagement">
3           <PC="104-A"/>
4           <ColorProFile="JapanColor"/>
5           <OutPutData="103"/>
6           <Status="Incomplete"/>
8       </Process>
9       <Process="Trapping">
10          <PC="104-B"/>
11          <TrappingMethodType="1"/>
12          <OutPutData="103"/>
13          <Status="Incomlete"/>
14      </Process>
15      <Process="Tiling">
16          <PC="104-C"/>
17          <TilingMethodType="3"/>
18          <OutPutData="103"/>
19          <Status="Incomplete"/>
20      </Process>
21      <Process="Imposition"/>
22          <PC="104-C"/>
23          <Layout="2UP"/>
24          <OutPutData="104-E"/>
25          <Status="Incomplete"/>
26      </Process>
27      <Process="Print">
28          <PC="104-D"/>
29          <OutPutData="103"/>
30          <Status="Incomplete"/>
31      </Process>
32  </JobTicket>
```

FIG. 8

| NAME OF IMAGE PROCESSING DEVICE | IP ADDRESS |
|---|---|
| 103 | 172.24.xx.xx1 |
| 104-A | 172.24.xx.x11 |
| 104-B | 172.24.xx.x12 |
| 104-C | 172.24.xx.x13 |
| 104-D | 172.24.xx.x14 |

FIG. 10

| Process Name | ColorManagement | Trapping | Smoothing | Preview | Print |
|---|---|---|---|---|---|
| FontEmbed Wanted or Not | Not Wanted | Not Wanted | Not Wanted | Wanted | Wanted |
| | ...... | ...... | ...... | ...... | ...... |

FIG. 11

```
1   <JobTicket>
2       <Process="ColorManagement">
3           <PC="104-A"/>
4           <ColorProFile="JapanColor"/>
5           <OutPutData="103"/>
6           <Status="Incomplete"/>
8       </Process>
9       <Process="Trapping">
10          <PC="104-B"/>
11          <TrappingMethodType="1"/>
12          <OutPutData="103"/>
13          <Status="Incomplete"/>
14      </Process>
15      <Process="Tiling">
16          <PC="104-C"/>
17          <TilingMethodType="3"/>
18          <OutPutData="103"/>
19          <Status="Incomplete"/>
20      </Process>
21      <Process="Imposition"/>
22          <PC="104-C"/>
23          <Layout="2UP"/>
24          <OutPutData="103"/>
25          <Status="Incomplete"/>
26      </Process>
27      <Process="FontEmbed">
28          <PC="103"/>
29   701    <FontEnbedList="ALL"/>
30          <OutPutData="103"/>
31          <Status="Incomplete"/>
32      </Process>
33      <Process="Print">
34          <PC="104-D"/>
35          <OutPutData="104-E"/>
36          <Status="Incomplete"/>
37      </Process>
38  </JobTicket>
```

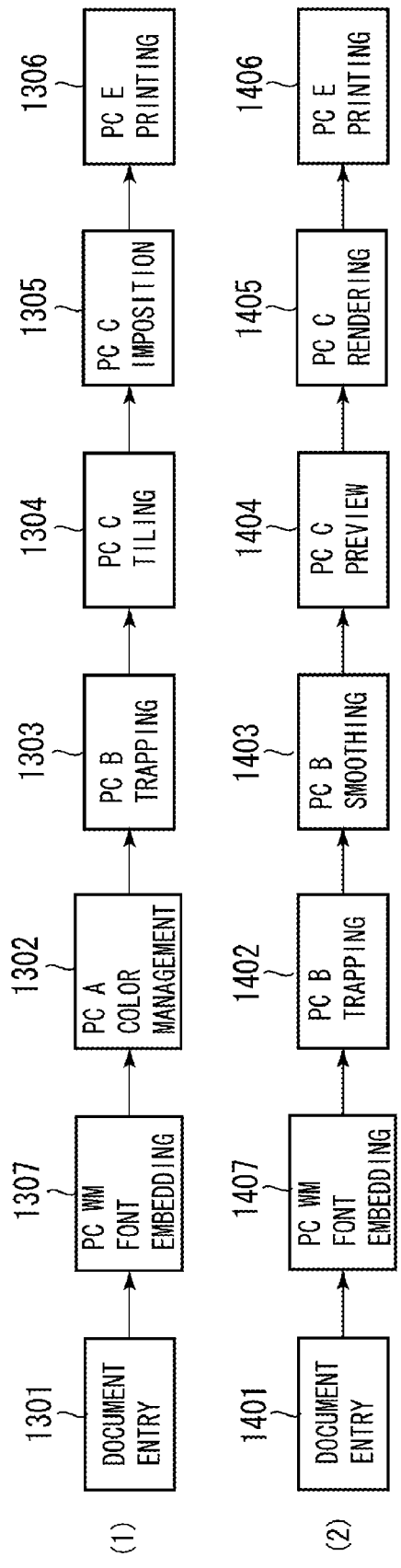
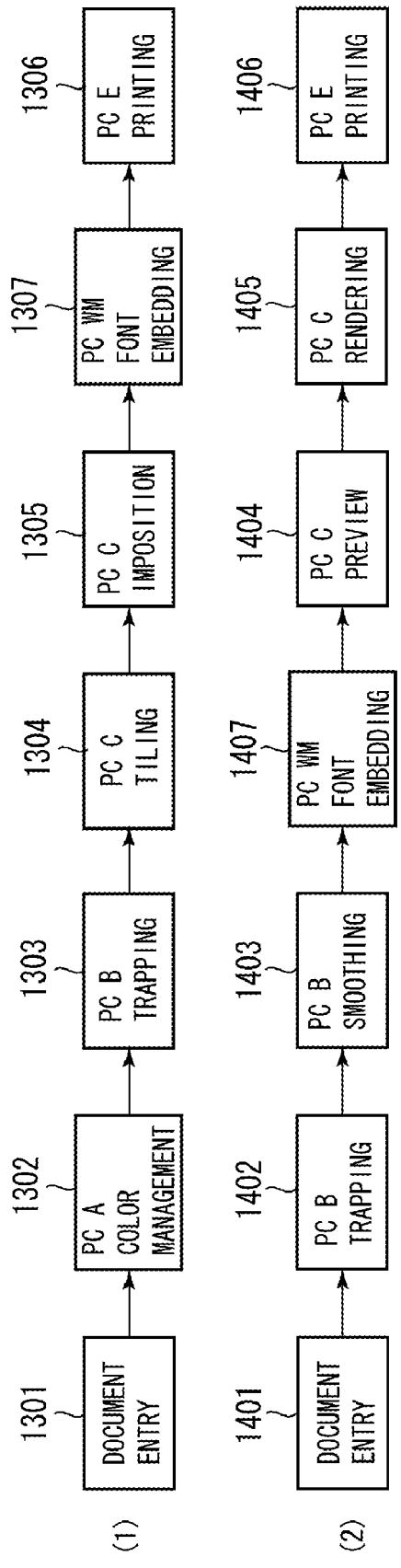
FIG. 13A PRIOR ART
FIG. 13B

FIG. 17

```
1   <JobTicket>
2       <Process="FontDelete">
3           <PC="103"/>
4           <FontDeleteList="ALL"/>
5           <OutPutData="103"/>
6           <Status="Incomplete"/>
8       </Process>
9       <Process="Coloranagement">
10          <PC="104-A"/>
11          <ColorProFile="JapanColor"/>
12          <OutPutData="103"/>
13          <Status="Incomplete"/>
14      </Process>
15      <Process="Trapping">
16          <PC="104-B"/>
17          <TrappingMethodType="1"/>
18          <OutPutData="103"/>
19          <Status="Incomplete"/>
20      </Process>
21      <Process="Tiling">
22          <PC="104-C"/>
23          <TilingMethodType="3"/>
24          <OutPutData="103"/>
25          <Status="Incomplete"/>
26      </Process>
27      <Process="Imposition"/>
28          <PC="104-C"/>
29          <Layout="2UP"/>
30          <OutPutData="103"/>
31          <Status="Incomplete"/>
32      </Process>
33      <Process="FontEmbed">
34          <PC="103"/>
35          <FontEnbedList="ALL"/>
36          <OutPutData="103"/>
37          <Status="Incomplete"/>
38      </Process>
39      <Process="Print">
40          <PC="104-D"/>
41          <OutPutData="104-E"/>
42          <Status="Incomplete"/>
43      </Process>
44  </JobTicket>
```

1701 = lines 3–8
1702 = lines 35–38

PRINTING SYSTEM TO OPTIMIZE PRINTING WORKFLOW

BACKGROUND OF THE INVENTION

1. Field of the Invention

The present invention relates to an image forming system configured to receive a print document and perform plural processes applied to the received print document according to a print instruction attached to the received print document.

2. Description of the Related Art

In the print processing, an object document and a print instruction are entered together into a printer. To this end, a document dedicated to an instruction related to a printing method (e.g., two-sided print) can be used as an independent document combinable with the print object document. The document including the print-related instruction can be paired with the print object document and is generally referred to as an "instruction" or "job ticket."

The job ticket can hold complicated print instructions and enables a printer to repeat the print processing according to a print method instructed by the job ticket. Furthermore, the job ticket enables a user to request a desirable final product (for example, "a book as a final product obtainable through bookbinding processing") without considering the presence or functions of an actual print processing device. For example, the job ticket is usable in the following practical printing system.

A printing system receives a user's request with respect to a final product (e.g., a book) together with a print object document file (hereinafter, referred to as an "original document"). Next, a job ticket producing apparatus produces a job ticket describing the processes required for obtaining the final product, processing devices actually used, and the order of the required processes.

Then, the job ticket and the original document are sent together to a job management apparatus. The job management apparatus gives an instruction to each processing apparatus according to the attached job ticket, and produces the final product (e.g., a book) resulting from the original document.

In the above-described printing system, the original document entered by a user generally includes resource information, such as font information, embedded in the document, because the "resource information" is required to obtain an intended output result.

For example, if information relating to a font used is not embedded in a document and if the font is not installed on a printer, the printer is required to use an alternative font. As a result, a user cannot obtain an intended print result.

On the other hand, a user may input a document including no resource information embedded. In such a case, a job producing apparatus generally produces a job ticket including an instruction, such as "processing for embedding resource information into the document." The produced job ticket and the original document are entered together into the job management apparatus.

As discussed in Japanese Patent Application Laid-Open No. 2004-246501, an image processing apparatus can delete font information (glyph information) embedded in a PDF (Portable Document Format) file, in the case of "direct printing", so as to reduce the data size transmitted to a printer.

In general, the job management apparatus in the aforementioned printing system receives a "resource embedding original document" paired with a job ticket, or receives an original document including no embedded resource and a job ticket including an instruction such as "processing for embedding resource into a document."

The processing of a resource embedded document can assure a print result as intended by a user. However, the file size tends to become larger because of the resource related data embedded in the original document. In other words, a heavy burden is placed on a communication path connecting respective processing devices. Furthermore, the processing time in each processing device becomes longer.

On the other hand, in an actual printing system, a resource embedded document is not always required in all processes. For example, a layout process and a smoothing process require no font resource, while a preview process and a printing process require (use) a font resource.

As understood from the foregoing description, it is desired to execute a resource embedding process immediately before starting a resource requiring (using) process, so as to reduce the document size in other preceding processes. In many processes, a small-size document (i.e., a document including no embedded resource) can be used.

In other words, embedding a required resource at optimum timing can improve the efficiency of the entire processing. However, the optimum timing varies depending on the contents of each workflow.

For example, when a workflow includes "color processing", "trapping processing", "tiling processing", "imposition processing", and "print processing" executed in this order, it is required to add "resource embedding processing" as a process to be executed immediately before starting the "print processing." In other words, according to this workflow, only the "print processing" is a resource requiring process.

Furthermore, when a workflow includes "trapping processing", "smoothing processing", "preview processing", "rendering processing", and "print processing" executed in this order, it is required to add "resource embedding processing" as a process to be executed immediately before starting the "preview processing." In other words, according to this workflow, both the "preview processing" and the "print processing" are resource requiring processes.

It is generally difficult for each end user to optimize the timing of the resource embedding processing in each workflow.

Therefore, a conventional job management apparatus simply inputs a resource embedded document, or inputs a job ticket not including "optimum resource embedding timing", which varies with each workflow.

SUMMARY OF THE INVENTION

Embodiments of the present invention are directed to a technique capable of overcoming or at least mitigating the above-described problems.

Embodiments of the present invention are directed to an image forming system configured to perform plural processes applied to a print document based on a print instruction attached to the print document, in which the data size of the print document in the processes preceding a resource requiring process can be reduced and the entire processing can be performed efficiently.

According to an aspect of the present invention, at least one exemplary embodiment provides an image forming system configured to execute print processing based on a print document and a print instruction that instructs plural processes applied to the print document. The image forming system includes an identifying unit configured to identify a process that uses resource information embedded in the print document, among the plural processes instructed by the print instruction, and a processing unit configured to execute a process for embedding the resource information into the print document before starting the process identified by the identifying unit.

According to yet another aspect of the present invention, at least one exemplary embodiment provides an image forming system: including a discrimination unit configured to discriminate a process that uses font information, among plural processes included in a print instruction that instructs the plural processes applied to a print document; and an adding unit configured to add a font embedding process to the print instruction such that a process for embedding font information into the print document can be executed before starting the process discriminated by the discrimination unit.

Furthermore, according to yet another aspect of the present invention, at least one exemplary embodiment provides a resource embedding method for an image forming system configured to execute print processing based on a print document and a print instruction that instructs plural processes applied to the print document. The method includes: identifying a process that uses resource information embedded in the print document, among the plural processes instructed by the print instruction; and executing a process for embedding the resource information into the print document before starting the identified process.

Also, according to another aspect of the present invention, at least one exemplary embodiment provides a method for embedding font information, including: discriminating a process that uses font information, among plural processes included in a print instruction that instructs the plural processes applied to a print document; and adding a font embedding process to the print instruction such that a process for embedding font information into the print document can be executed before starting the discriminated process.

Additionally, according to another aspect of the present invention, at least one exemplary embodiment provides a computer-readable storage medium storing instructions which, when executed by a computer, causes the computer to perform operations including: discriminating a process that uses font information, among plural processes included in a print instruction that instructs the plural processes applied to a print document; and adding a font embedding process to the print instruction such that a process for embedding font information into the print document can be executed before starting the discriminated process.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing an example of a job ticket in accordance with an exemplary embodiment.

FIG. 8 is a view showing an example of an address table listing the name of each computer and a corresponding IP address in accordance with an exemplary embodiment.

FIG. 10 is a view showing an example of a font embedding document requiring process list in accordance with an exemplary embodiment.

FIG. 11 is a view showing an example of a job ticket rewritten by a job ticket optimization processing section.

FIG. 13A is a view schematically showing conventional font embedding processing.

FIG. 13B is a view schematically showing font embedding processing in accordance with the first exemplary embodiment.

FIG. 17 is a view showing an example of a job ticket rewritten by the job ticket optimization processing section in step S508-0 shown in FIG. 16.

DETAILED DESCRIPTION OF THE EMBODIMENTS

Figure 1:
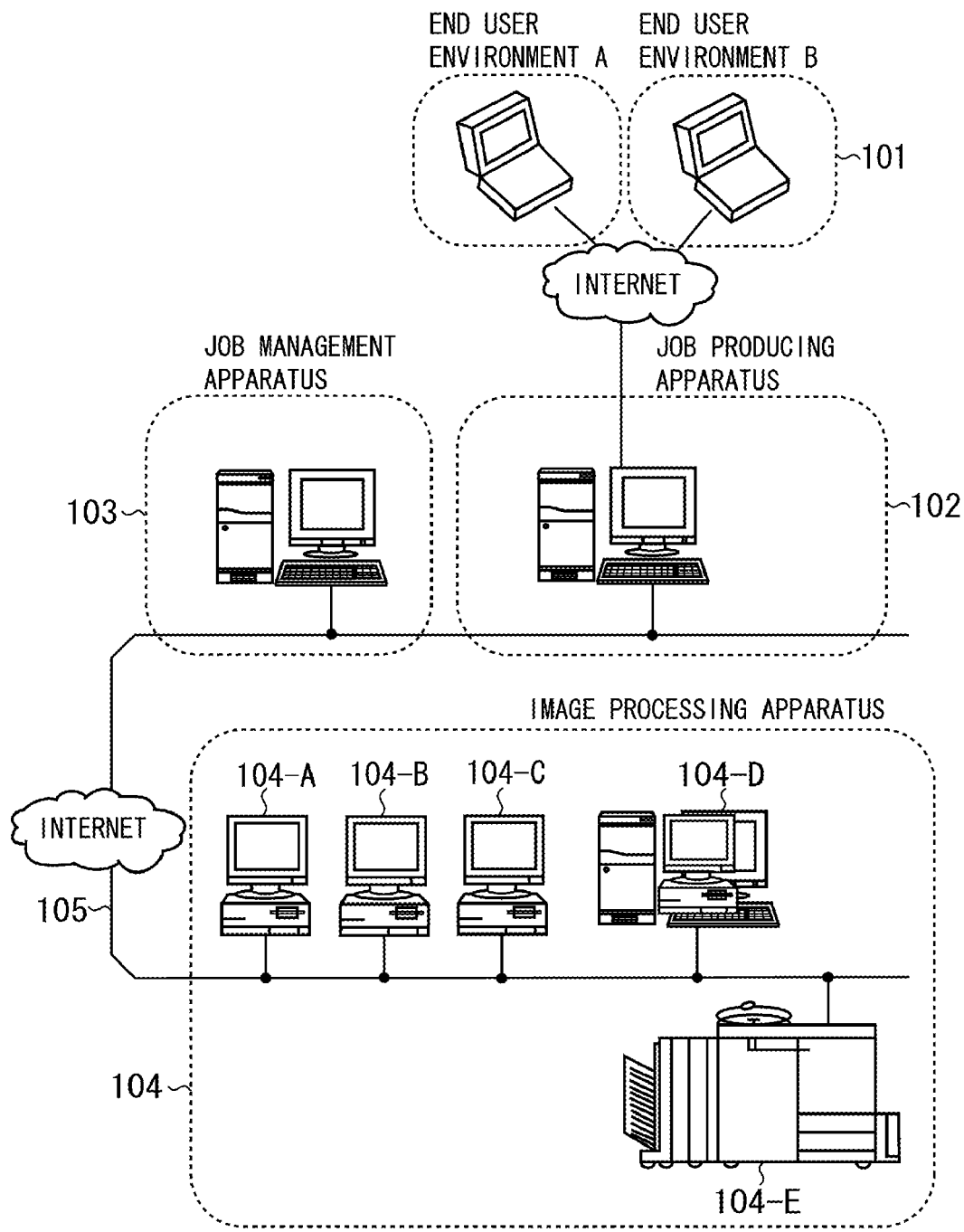
FIG. 1 is a diagram illustrating an example of a system arrangement including a job management apparatus according to a first exemplary embodiment.

The following description of exemplary embodiments is merely illustrative in nature and is in no way intended to limit the invention, its application, or uses.

Processes, techniques, apparatus, and materials as known by one of ordinary skill in the art may not be discussed in detail but are intended to be part of the enabling description where appropriate.

For example, certain circuitry for image processing, data processing, and other uses may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments will be described in detail below with reference to the drawings.

First Exemplary Embodiment

Exemplary System Arrangement

FIG. 1 is a diagram illustrating an example of a system arrangement including a job management apparatus according to a first exemplary embodiment.

In FIG. 1, a print job management apparatus 103, including a computer or another information processing apparatus, is connected to one or more job producing apparatuses 102, and one or more image processing apparatuses 104 via a network 105 (e.g., the Internet). The print job management apparatus 103 can function as a workflow manager (PC WM) in an image processing system.

The job producing apparatus 102, configured by a computer or another information processing apparatus, is connected to an end user environment 101 (configured by a personal computer or the like) that orders a print job via the network 105 (e.g., the Internet). The job producing apparatus 102 can be provided in the end user environment 101.

The job producing apparatus 102 can produce a job ticket (i.e., a work instruction) based on a request issued from an end user, and can transmit the job ticket and a print object document to the job management apparatus 103.

The job producing apparatus 102 can be arbitrarily arranged, as long as it can realize the above-described function. For example, a well-known file format, such as PDF (Portable Document Format) provided by Adobe Systems Incorporated, can be used to create a print object document.

The job management apparatus 103 instructs the image processing apparatus 104 to perform print and bookbinding processing applied to the print object document received from the job producing apparatus 102, based on an instruction involved in the job ticket received from the job producing apparatus 102.

The image processing apparatus 104, configured by a computer or another information processing apparatus and various devices, can execute various image processing based on the instruction issued from the job management apparatus 103 and can output a final print product.

The image processing includes image correction of a print object document, merging of files or insertion/deletion of pages, layout/edition of various pages, imposition processing, and printout processing performed by a print device. Furthermore, the image processing includes finishing processing performed by post-processing devices (such as a paper-folding machine, a saddle stitching bookbinding machine, and a case bookbinding machine).

In the present exemplary embodiment, the image processing apparatus 104 includes four computers 104-A, 104-B, 104-C, and 104-D and a single printer 104-E.

<Exemplary Software Arrangement>

Figure 2:
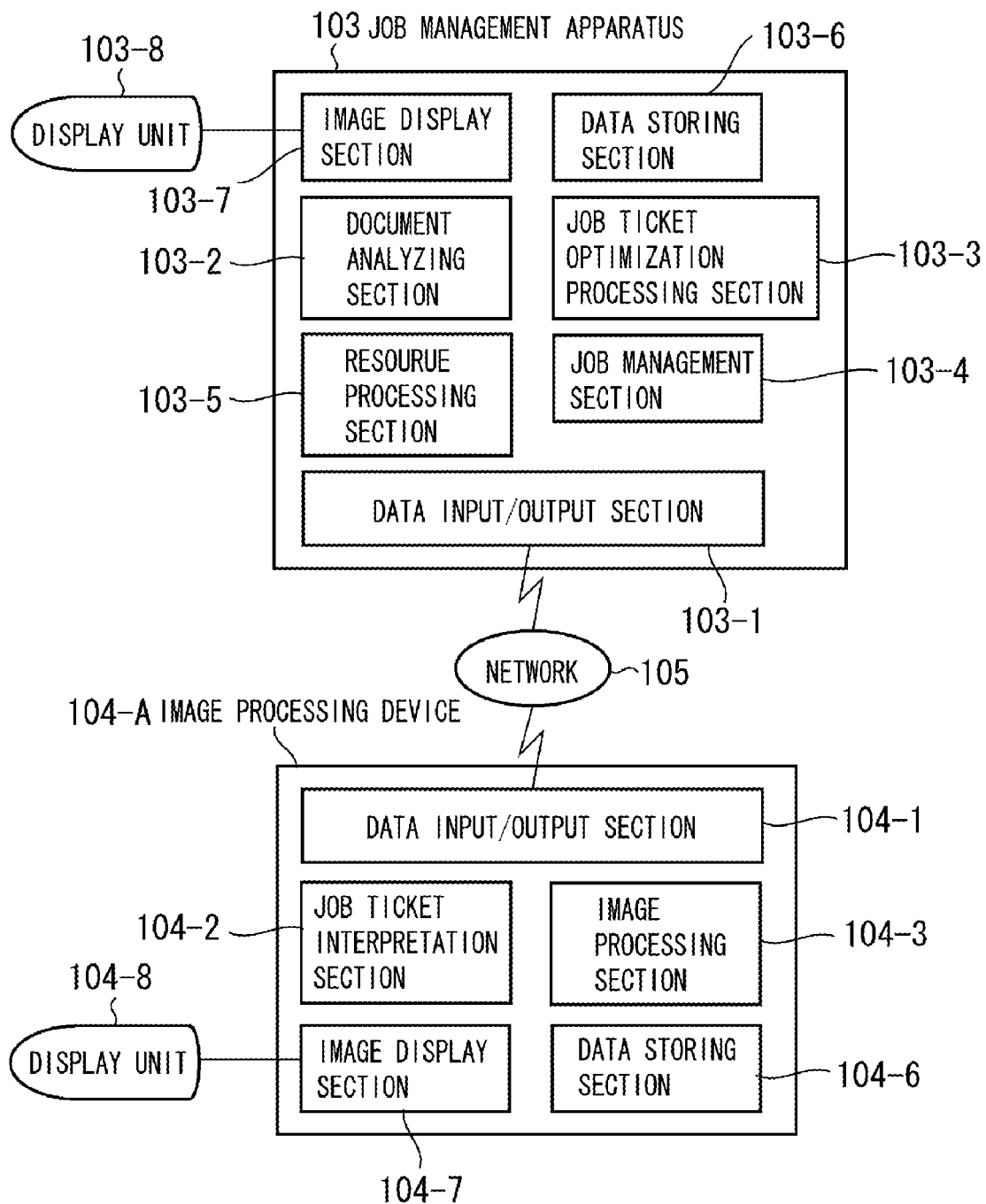
FIG. 2 is a block diagram illustrating an example of a software arrangement in the job management apparatus and an image processing apparatus shown in FIG. 1.

FIG. 2 is a block diagram illustrating an example of a software arrangement in the job management apparatus 103 and the image processing apparatus 104 shown in FIG. 1.

The job management apparatus 103 can be configured by a single apparatus or by plural devices. Although FIG. 1 shows a practical arrangement including plural devices, FIG. 2 shows only one image processing device 104-A for the purpose of showing a simplified illustration.

The job management apparatus 103 includes a data input/output section 103-1, a document analyzing section 103-2, a job ticket optimization processing section 103-3, a job management section 103-4, a resource processing section 103-5, and an image display section 103-7 connected to a display unit 103-8.

Furthermore, the job management apparatus 103 includes a data storing section 103-6 that can store application data files created using a document processing application (not shown) or another application program and job tickets used in the present exemplary embodiment.

The data storing section 103-6 can store system information relating to font files managed by an operating system of the job management apparatus 103. Moreover, the data storing section 103-6 can store a database including software resources and hardware resources for the job management apparatus 103.

The document analyzing section 103-2 can analyze the presence of any resource, such as fonts of letters and images, embedded in the original document.

The resource processing section 103-5 can perform processing for embedding the resource, such as fonts of letters, into an original document. Although not described in the following description, the present exemplary embodiment can include images involved in the original document and other resources in addition to fonts of letters.

Furthermore, in the present exemplary embodiment, the resource processing section 103-5 constitutes part of the job management apparatus 103. However, the image processing apparatus 104 can include the resource processing section 103-5.

The job ticket optimization processing section 103-3 can interpret the received job ticket, and can perform rewriting processing for optimizing the job ticket if necessary. The job management section 103-4 can manage the entire job with reference to the contents of the job ticket. For example, the job management section 103-4 can instruct a work to each image processing apparatus 104.

The data input/output section 103-1 can communicate with the job producing apparatus 102 or with the image processing apparatus 104 via the network 105 (e.g., a telephone line or LAN, or the Internet), to exchange data (e.g., a job ticket and an original document). An input/output device, such as a keyboard and/or a pointing device, can be connected to the data input/output section 103-1.

The image processing device 104-A includes a data input/output section 104-1, a job ticket interpretation section 104-2, an image processing section 104-3, and an image display section 104-7 connected to a display unit 104-8. Moreover, the image processing device 104-A includes a data storing section 104-6.

The data storing section 104-6 can store application data files created using a document processing application (not shown) or another application program, and job tickets used in the present exemplary embodiment, as well as original document files received from the job management apparatus 103. Also, the data storing section 104-6 can store system information relating to font files managed by an operating system of the image processing device 104-A.

The data input/output section 104-1, the display unit 104-8, and the image display section 104-7 are functionally similar to those shown in the job management apparatus 103. The job ticket interpretation section 104-2 can interpret a job ticket received from the job management apparatus 103, and can control the image processing section 104-3.

The image processing section 104-3 can perform processing required for printing according to an instruction received from the job ticket interpretation section 104-2. The processing required for printing is, for example, "color management", "trapping", and "imposition." The image processing device 104-A can hold a function for performing the "color management" processing.

Other image processing devices 104-B, 104-C, and 104-D are similar in software arrangement to the image processing device 104-A shown in FIG. 2, except for the image processing section 104-3.

Figures 3, 4:
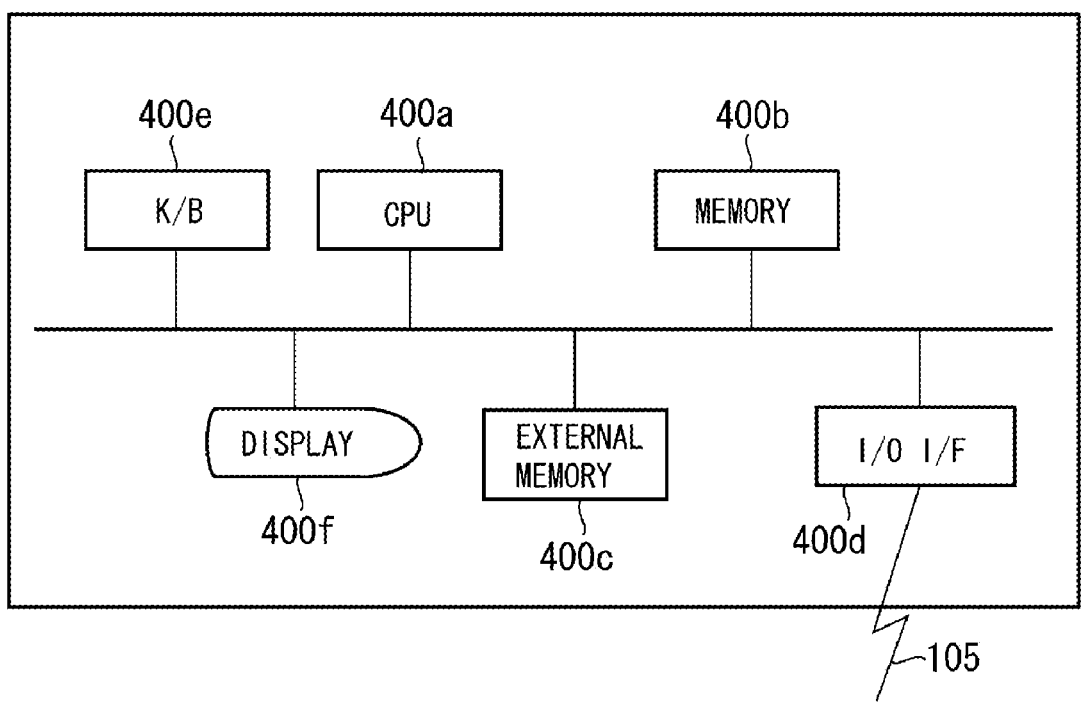
FIG. 3 is a view showing a list of image processing executable by respective image processing devices shown in FIG. 1.
FIG. 4 is a block diagram illustrating an example of a hardware arrangement of an information processing apparatus usable as a job producing apparatus, the job management apparatus, and the image processing apparatus shown in FIG. 1.

FIG. 3 is a view showing a list of image processing executable by respective image processing devices 104-A to 104-D shown in FIG. 1.

As shown in FIG. 3, the image processing device 104-A can perform "color management" processing. The image processing device 104-B can perform "trapping", "screening", and "smoothing" processing. The image processing device 104-C can perform "tiling", "imposition", "preview", and "rendering" processing. The image processing device 104-D can perform "print" processing. In other words, the image processing devices are differentiated from each other in the contents of the processing executable.

<Exemplary Hardware Arrangement>

FIG. 4 is a block diagram illustrating an example of a hardware arrangement of an information processing apparatus usable as the job producing apparatus 102, the job management apparatus 103, and the image processing apparatus 104 shown in FIG. 1.

In FIG. 4, a CPU 400a can load a program, from an external memory 400c, into a memory 400b and execute the readout program so as to realize the software arrangement of the job management apparatus 103 and the image processing apparatus 104 shown in FIG. 2. The external memory 400c can be a hard disk, or a removable storage medium such as a flexible disk or a CD-ROM.

A partial region of the external memory 400c can realize the data storing section 103-6 and the data storing section 104-6 shown in FIG. 2. A display unit 400f, corresponding to the display unit 103-8 or the display unit 104-8, can display an image.

An input/output interface (I/O I/F) 400d is connected to the network 105. A keyboard (K/B) 400e, or a pointing device, enables a user to input instructions or data.

Next, the processing procedure according to the present exemplary embodiment will be described below.

In the present exemplary embodiment, a font can be a resource to be embedded as described above. The following is the drawing mechanism for characters applied to an intermediate file, such as PDF or SVG (Scalable Vector Graphics), which is a general file format of an original document to be input in a printing system.

<Character Drawing Mechanism Applied to Intermediate File>

A PDF or another intermediate file includes a drawing command describing an object constituting a document and an operand indicating the position and size of the object.

The drawing commands are generally classified, according to the type of an object, into three types: "character" commands for producing characters; "image" commands for producing bitmap images; and "graphics" commands for producing straight lines, circles, rectangles, and other shapes.

The Windows (registered trademark) system of Microsoft Corporation provides the following "character" drawing commands.

Figure 5:
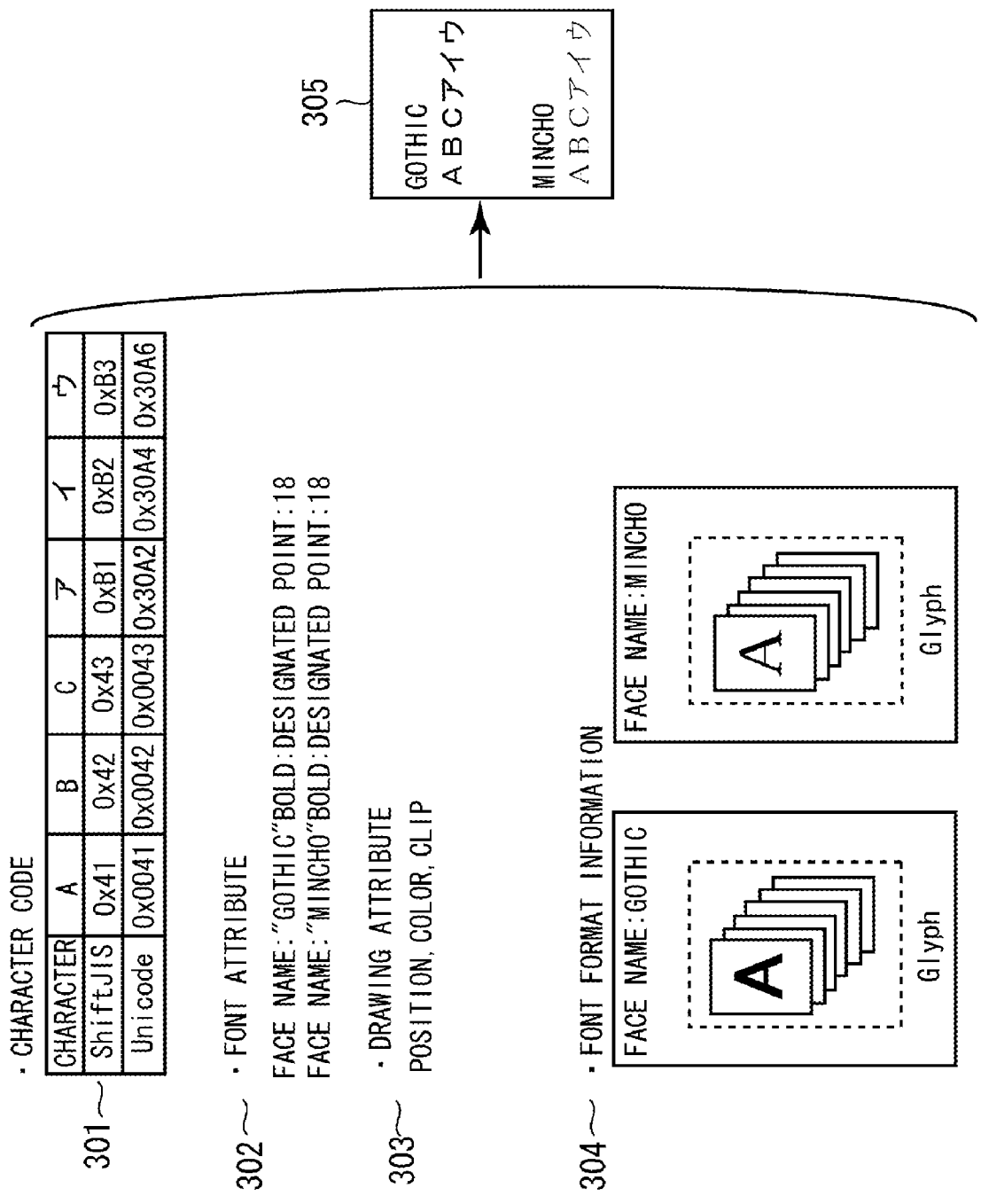
FIG. 5 is a view showing exemplary information relating to drawing characters.

FIG. 5 is a view showing exemplary information relating to the drawing of characters.

In general, the character drawing command requires, as operands, the following font information.

(1) Character Code 301: defined as information identifying a character, expressed using a predetermined character code, such as ASCII, ShiftJIS, or Unicode.

(2) Font Attribute 302: including font information, such as a font face name adapted to drawing characters, an italic/bold instruction for decorating a glyph, and a point number representing the size of a character.

(3) Drawing Attribute 303: including a drawing position of a character and other information such as color, and the state of clip.

(4) Font Format Information 304: including a character drawing form instructed by a face name, such as Gothic or Mincho, and having drawing form information of each character (referred to as "glyph"). The font information is roughly classified into bitmap fonts and outline fonts, and various formats, including TrueType (registered trademark) and OPENTYPE (registered trademark), are defined.

All of the above-described information is required to form drawing of characters 305 as intended by the user.

In general, the character drawing data involved in an intermediate file includes a character drawing command composed of, as font information, a character code, a font attribute, and a drawing attribute. When a computer executes drawing of characters, i.e., when an intermediate file is reproduced, the computer executes the following processing.

First, based on a font face name involved in the character drawing command, the computer refers to the font format information of the same font face name recognized by an OS (Operating System) managing the computer.

However, the instructed font format information may not be present in each computer environment (i.e., in a resource provided by the OS). In other words, the font format information available in a computer environment in which a user can produce an intermediate file (referred to as an intermediate file creation environment) may not be present in a computer environment in which drawing of characters is performed (referred to as a character drawing execution environment).

A conventional font embedding technique enables a user who created application data to realize the drawing of characters using font data the user intends to use, even if such font data is unavailable in a computer environment in which the drawing of characters is performed.

According to the font embedding technique, font format information is embedded into the character drawing data (i.e., into the intermediate file) which includes the character drawing command (character code, font attribute, and drawing attribute). Thus, the font format information used for the character drawing data is usable in the character drawing execution environment.

The font format information embedded in the character drawing data can be registered as fonts provided in the character drawing execution environment. The drawing of characters based on the character drawing data can be realized using the registered fonts. Accordingly, the font embedding technique enables a user to obtain an intended print output, even when the font data instructed by the character drawing command involved in the character drawing data is not present in the drawing execution environment.

However, according to the above-described method, the character drawing data includes the font format information embedded. Therefore, there is the tendency that the character drawing data amount becomes larger. Especially, Japanese fonts and Chinese fonts include numerous types of characters to be embedded.

<Exemplary Processing Procedure According to First Exemplary Embodiment>

Figure 6:
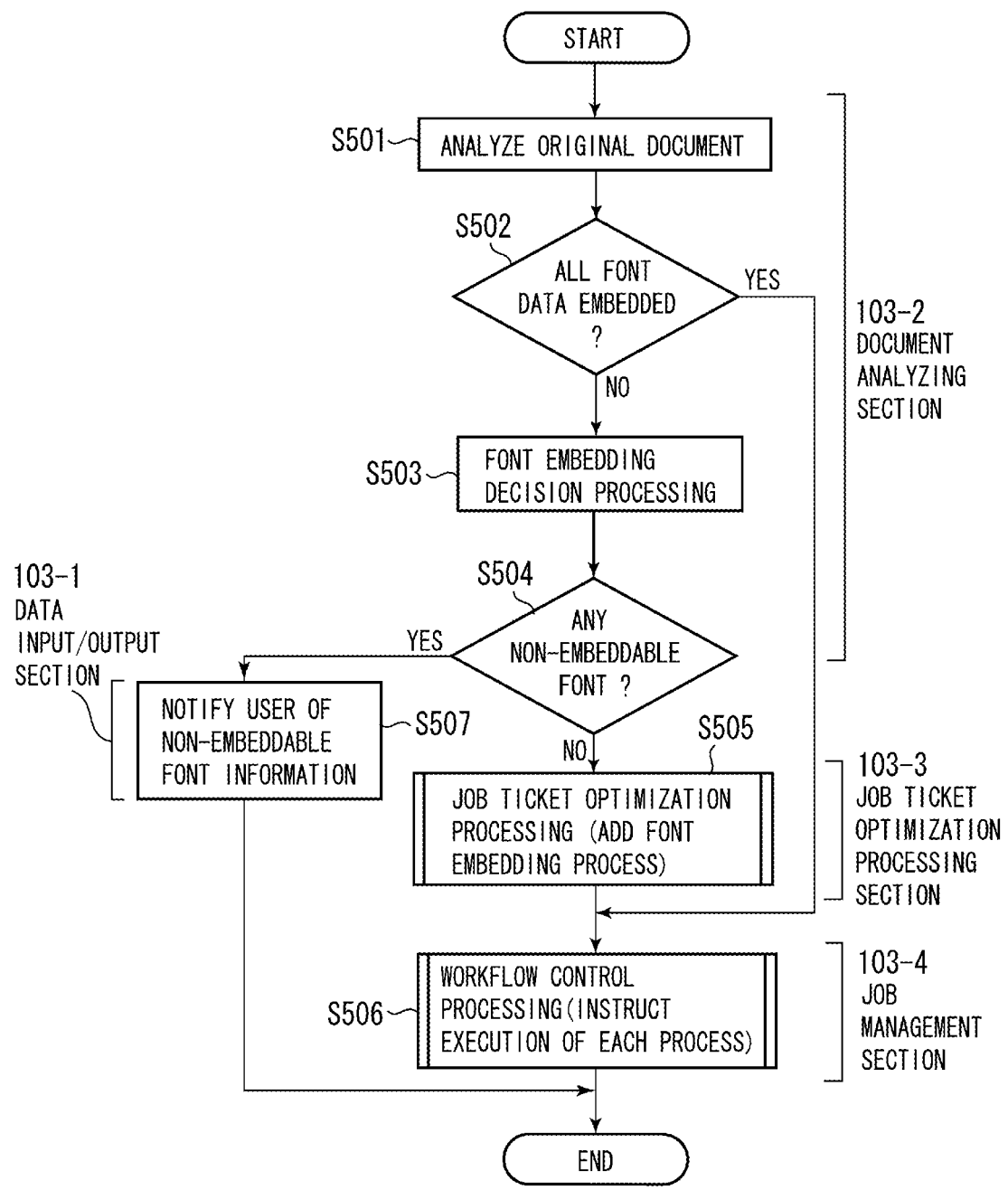
FIG. 6 is a flowchart showing an example of a first control processing procedure of an image processing system in accordance with the present exemplary embodiment.

The job management apparatus 103 performs processing shown in the flowchart of FIG. 6.

FIG. 6 is a flowchart showing an example of a first control processing procedure of an image processing system in accordance with the present exemplary embodiment. In the flowchart, steps S501 to S504 show the processing performed by the document analyzing section 103-2. Step S505 shows the processing performed by the job ticket optimization processing section 103-3. Step S506 shows the processing performed by the job management section 103-4. Step S507 shows the processing performed by the data input/output section 103-1.

More specifically, the CPU of the job management apparatus 103 loads the program stored in the external memory into the memory and executes the program to realize the processing of steps S501 to S507.

When the data input/output section 103-1 receives an original document and a job ticket from the job producing apparatus 102, the job management apparatus 103 starts the processing of the flowchart.

First, in step S501, the document analyzing section 103-2 analyzes the original document. Then, in step S502, the document analyzing section 103-2 determines whether the font format information 304 of the font data used is embedded in the original document. As a practical decision method, the document analyzing section 103-2 can check whether the document involves the character code of the font used and character format information corresponding to the font face name.

When all of the font data used is embedded in the original document, the processing flow proceeds to step S506.

On the other hand, when at least part of the font data used is not embedded in the original document, the document analyzing section 103-2 performs the processing of step S503.

In step S503, the document analyzing section 103-2 determines whether the non-embedded font data can be embedded in the original document. First, the document analyzing section 103-2 obtains a font list installed in the job management apparatus 103 (i.e., the environment in which the font embedding processing is executed).

If there is any non-embedded font data not yet described in the font list, or if the non-embedded font data include any license font data, the document analyzing section 103-2 determines that the non-embedded font data are "non-embeddable." For example, when the font data is TrueType font data, license fonts are shown in an OS/2 table of the TrueType font table.

Next, in step S504, the document analyzing section 103-2 determines based on the result of step S503 whether there is any non-embeddable font data. When there is any non-embeddable font data, the processing flow proceeds to step S507.

In step S507, the data input/output section 103-1 sends a message such as "Due to presence of non-embeddable font data, intended output may not be obtained" to a user or to the job producing apparatus 102 before terminating the processing.

On the other hand, when the document analyzing section 103-2 determines that there is no non-embeddable font data in step S504, the processing flow proceeds to step S505.

In step S505, the job ticket optimization processing section 103-3 analyzes the entered job ticket, and identifies a process that requires the original document involving embedded font data.

Then, the job ticket optimization processing section 103-3 adds, in the job ticket, an instruction such as "embed font data" to a position before the identified step. Details of the processing will be described later.

Next, in step S506, the job management section 103-4 instructs a work to each image processing apparatus according to instructions involved in the job ticket. After accomplishing all of the instructions described in the job ticket, the job management section 103-4 terminates the processing of this routine. Details of the processing will be described later.

Before describing the details of the job ticket optimization processing performed in step S505 and the workflow control processing performed in step S506, the present exemplary embodiment gives a detailed description with respect to the job ticket.

<Exemplary Job Ticket According to First Exemplary Embodiment>

FIG. 7 is a view showing an example of a job ticket used in the present exemplary embodiment.

As shown in the example, the job ticket can be described according to a text document format using a markup language, such as SGML or XML. However, the disclosure of the exemplary job ticket is limited to a portion relating to the present exemplary embodiment.

The exemplary job ticket shown in FIG. 7 includes a total of 32 lines. The first line of the job ticket indicates the beginning of description relating to the job ticket. The 32nd line of the job ticket indicates the ending of description relating to the job ticket.

The second to 31st lines of the job ticket are description relating to the instructions. The second, ninth, 15th, 21st, and 27th lines (i.e., second layer tag) of the job ticket indicate process names (processing names) performed by each image processing apparatus 104. The job management apparatus 103 controls each image processing apparatus 104 to execute the processes (second layer tag) shown in FIG. 7 according to the described order, and outputs a final print product.

According to the example shown in FIG. 7, the job ticket first instructs execution of color management processing (refer to the second line), next instructs execution of trapping processing (refer to the ninth line), then instructs execution of tiling processing (refer to the 15th line), further instructs the execution of imposition processing (refer to the 21st line), and finally instructs execution of print processing (refer to the 27th line). In this manner, the job ticket includes a predetermined number of instructions relating to the processes to be successively executed.

The third layer tag describes setting parameters for each processing.

For example, the third to sixth lines of the job ticket show the parameters relating to the color management processing. The third line describes a name identifying a computer that performs the color management processing. The job management section 103-4 can determine, based on this parameter, a destination to which the job should be transmitted.

For example, the job management section 103-4 can determine the transmission destination of the job with reference to an address table.

FIG. 8 shows an exemplary address table listing the name of each computer in relation to a corresponding IP address (i.e., an address allocated to each computer on the network).

In the present exemplary embodiment, the data storing section 103-6 of the job management apparatus 103 can hold the address table shown in FIG. 8.

Referring back to FIG. 7, the job management section 103-4 transmits the original document and the job ticket to the image processing apparatus identified by the description of the third line of the job ticket. In the present exemplary embodiment, the job ticket transmitted to each image processing apparatus is a limited portion of the original job ticket which relates to the processing performed by the image processing apparatus. For example, the job ticket to be transmitted to the image processing device 104-A is limited to the second to eighth lines of the job ticket shown in FIG. 7.

The fourth line of the job ticket instructs a profile to be used for the actual color management. The job interpretation section 104-2 processes the original document according to the instructed profile.

The fifth line of the job ticket instructs an output destination of the original document to which the color management processing is applied. The job interpretation section 104-2 identifies an output destination of the job with reference to this parameter, in the same manner as the method for identifying the image processing apparatus in the third line of the job ticket.

The sixth line of the job ticket indicates the status of a job. When the job is not yet processed, the job status is indicated as "Incomplete." When the job is already processed, the job status is indicated as "Complete."

Based on this information, the job interpretation section 104-2 informs the job management section 103-4 of accomplishment of the instructed processing. In response to the completion notice, the job management section 103-4 starts succeeding processing.

In actual color management processing, other numerous parameters (setting items) are required to be described in the third layer of the job ticket. However, the exemplary job ticket shown in FIG. 7 does not include such detailed parameters (setting values).

Similar to the above-described color management processing, the third layer tag of other processing instructs parameters required for each processing.

Next, the job ticket optimization processing in step S505 of FIG. 6 will be described below in detail with reference to the flowchart shown in FIG. 9.

Figure 9:
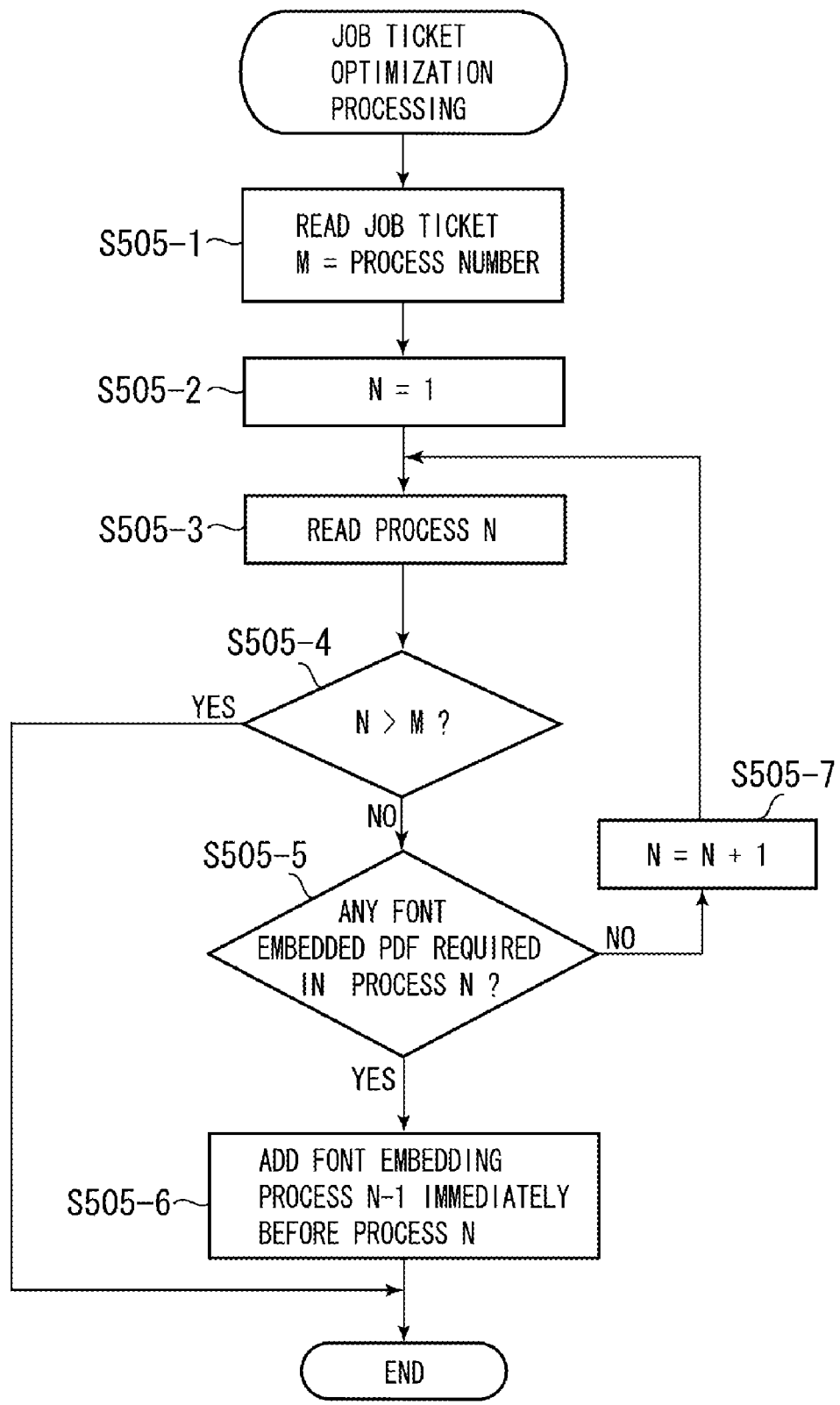
FIG. 9 is a flowchart showing an example of a second control processing procedure of the image processing system in accordance with an exemplary embodiment.

FIG. 9 is a flowchart showing an example of a second control processing procedure of the image processing system in accordance with the present exemplary embodiment, corresponding to the job ticket optimization processing in step S505. In the flowchart, steps S505-1 to S505-7 show the processing performed by the job ticket optimization processing section 103-3. More specifically, the CPU of the job management apparatus 103 loads the program stored in the external memory into the memory and executes the program to realize the processing of steps S505-1 to S505-7.

First, in step S505-1, the job ticket optimization processing section 103-3 reads a job ticket stored in the data storing section 103-6, and obtains a process number described in the job ticket, and then sets the process number to a variable M stored in the memory. According to the exemplary job ticket shown in FIG. 7, the process number is "5" (the process number is equal to the number of tags).

Next, in step S505-2, the job ticket optimization processing section 103-3 sets a counter N to "1." The counter N is stored in the memory.

Next, in step S505-3, the job ticket optimization processing section 103-3 reads an N-th process from the job ticket stored in the data storing section 103-6. Then, in step S505-4, the job ticket optimization processing section 103-3 compares the counter N with the variable M. When the counter N is greater than the variable M ("Yes" in step S505-4), the job ticket optimization processing section 103-3 terminates the processing of this routine.

On the other hand, when the counter N is not greater than the variable M ("No" in step S505-4), the processing flow proceeds to step S505-5.

In step S505-5, the job ticket optimization processing section 103-3 determines whether the processing instructed in the process N requires a font embedded document.

For example, the job ticket optimization processing section 103-3 can make the decision by referring to a "font embedding document requiring process list" stored in the data storing section 103-6 of the job management apparatus 103. The "font embedding document requiring process list" describes beforehand every process that requires a font embedding document.

FIG. 10 shows an example of the font embedding document requiring process list according to the present exemplary embodiment. As shown in FIG. 10, the font embedding document requiring process list describes a process name "Process Name" and necessity of font embedding "FontEmbed Wanted or Not." According to the example shown in FIG. 10, the preview processing "Preview" and the print processing "Print" require a font embedding original document (i.e., "Wanted").

Referring back to the flowchart of FIG. 9, when no font embedding document is required in step S505-5, the processing flow proceeds to step S505-7.

In step S505-7, the job ticket optimization processing section 103-3 increments the counter N by 1. Then, the processing flow returns to step S505-3.

On the other hand, when a font embedding document is required in step S505-5, the processing flow proceeds to step S505-6.

In step S505-6, the job ticket optimization processing section 103-3 adds a font embedding process as a preceding process (i.e., process N−1). Then, the job ticket optimization processing section 103-3 terminates the processing of this routine.

With the above-described processing, for example, when the job ticket shown in FIG. 7 is entered and when the font embedding document requiring process list shown in FIG. 10 is available, the job ticket can be rewritten as shown in FIG. 11.

FIG. 11 is a view showing an example of a job ticket rewritten by the job ticket optimization processing section 103-3.

The job ticket shown in FIG. 11 includes a font embedding process 701 (i.e., the 27th to 32nd lines of FIG. 11) in addition to the contents of the job ticket shown in FIG. 7.

Next, with reference to the flowchart of FIG. 12, the processing procedure of the workflow control processing in step S506 shown in FIG. 6 will be described below in detail.

Figure 12:
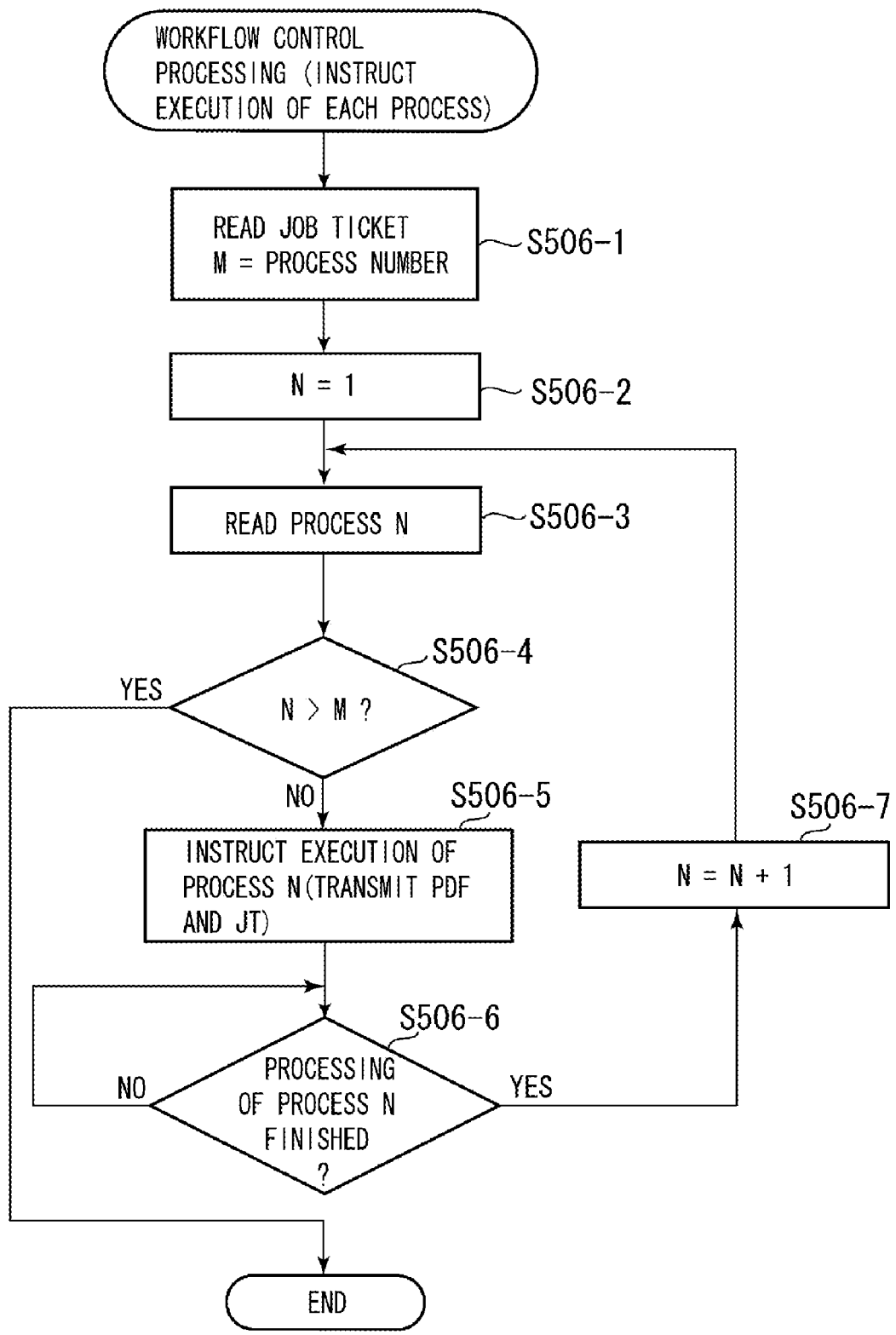
FIG. 12 is a flowchart showing an example of a third control processing procedure of the image processing system in accordance with an exemplary embodiment.

FIG. 12 is a flowchart showing an example of a third control processing procedure of the image processing system in accordance with the present exemplary embodiment, corresponding to the workflow control processing of step S506. In the flowchart, steps S506-1 to S506-7 show the processing performed by the job management section 103-4. More specifically, the CPU of the job management apparatus 103 loads the program stored in the external memory into the memory and executes the program to realize the processing of steps S506-1 to S506-7.

First, in step S506-1, the job management section 103-4 reads a job ticket stored in the data storing section 103-6, and obtains a process number stored in the job ticket, and then sets the process number to a variable M stored in the memory. According to the exemplary job ticket shown in FIG. 11, the process number is "6" (the process number is equal to the number of tags).

Next, in step S506-2, the job management section 103-4 sets a counter N stored in the memory to "1."

Next, in step S506-3, the job management section 103-4 reads an N-th process from the job ticket stored in the data storing section 103-6.

Then, in step S506-4, the job management section 103-4 compares the counter N with the variable M. When the counter N is not greater than the variable M, the processing flow proceeds to step S506-5.

In step S506-5, the job management section 103-4 transmits the original document and the job ticket to each image processing apparatus 104 so as to execute the processing instructed by the process N.

Through the above-described processing, each image processing apparatus 104 receives the job (i.e., the original document and the job ticket) and the job ticket interpretation section 104-2 interprets the job ticket and executes the processing. Upon finishing the processing, the image processing apparatus 104 returns a completion notice to the job management section 103.

Next, in step S506-6, the job management section 103-4 determines whether the image processing apparatus 104 has finished the processing of the process N. The job management section 103-4 can determine the termination of the processing based on the completion notice returned from the image processing apparatus 104.

When the job management section 103-4 receives the completion notice returned from the image processing apparatus 104 ("Yes" in step S506-6), the processing flow proceeds to step S506-7.

In step S506-7, the job management section 103-4 increments the counter N by 1. The processing flow returns to step S506-3 to read the next process.

Then, in step S506-4, when the counter N is greater than the variable M, the job management section 103-4 terminates the processing of this routine.

A print document including no embedded resource (font format information) may be entered together with a job ticket including a process for "embedding a resource in a print document." In such a case, the job ticket optimization processing section 103-3 operates in the following manner.

First, the job ticket optimization processing section 103-3 once deletes, from the job ticket, the process for "embedding a resource in a print document."

Then, the job ticket optimization processing section 103-3 rewrites the print instruction so that the resource can be embedded into the print document immediately before starting the resource requiring (using) process. Thus, even when the aforementioned print document and the job ticket are entered, the data size of the print document in the processes preceding a resource requiring process can be reduced. The entire processing can be performed efficiently.

If the process for "embedding a resource in a print document" is already present at an optimum position (i.e., at a position immediately preceding the resource requiring process), the job ticket optimization processing section 103-3 does not rewrite the job ticket.

As described above, when plural processes are applied to a print document in response to reception of the print document accompanied by a job ticket, the present exemplary embodiment can rewrite the job ticket (print instruction), so that the resource can be embedded into the print document immediately before starting the resource requiring process. Thus, the data size of the print document in the processes preceding a resource requiring process can be reduced. The entire processing can be performed efficiently.

The font embedding processing according to the present exemplary embodiment will be described with reference to FIGS. 13A and 13B, and FIG. 14, in comparison with the conventional font embedding processing.

FIG. 13A is a view schematically showing the conventional font embedding processing. FIG. 13B is a view schematically showing the font embedding processing in accordance with the first exemplary embodiment.

As shown in FIG. 13A, the conventional method includes the font embedding processing performed immediately after the entry of a print document. In this manner, regardless of the type of workflow to be processed, the conventional font embedding processing is performed immediately after the entry of a print document or at predetermined timing. As a result, all of the processes succeeding the font embedding processing are required to handle a large-size PDF file (font embedding PDF). Accordingly, the processing time increases.

According to the example shown in FIG. 13A, in each of workflows (1) and (2), the font embedding processing (refer to processes 1307 and 1407) is performed immediately after a document entry process (refer to processes 1301 and 1401). Therefore, succeeding processes 1302-1306 and 1402-1406 are required to handle the font embedding PDF. A heavy burden is placed on each image processing apparatus. Accordingly, the entire processing time increases.

On the other hand, as shown in FIG. 13B, the present exemplary embodiment performs the font embedding processing immediately before starting the font embedding PDF requiring process.

According to the example shown in FIG. 13B, the workflow (1) includes a process 1307 performing the font embedding processing immediately before starting the font embedding PDF requiring process (i.e., a printing process 1306). Therefore, all of the preceding processes 1301 to 1305 can handle the PDF including no embedded font data.

Similarly, the workflow (2) includes a process 1407 performing the font embedding processing immediately before starting the font embedding PDF requiring process (i.e., a preview process 1404). Therefore, all of the preceding processes 1401 to 1403 can handle the PDF including no embedded font data.

As described above, the size of PDF data in the processes preceding a font embedding PDF requiring process can be reduced. The burden placed on each image processing apparatus can be reduced. Accordingly, the processing time can be reduced.

Next, with reference to FIG. 14, an exemplary arrangement and operations of the image processing system according to the present exemplary embodiment will be described.

Figure 14:
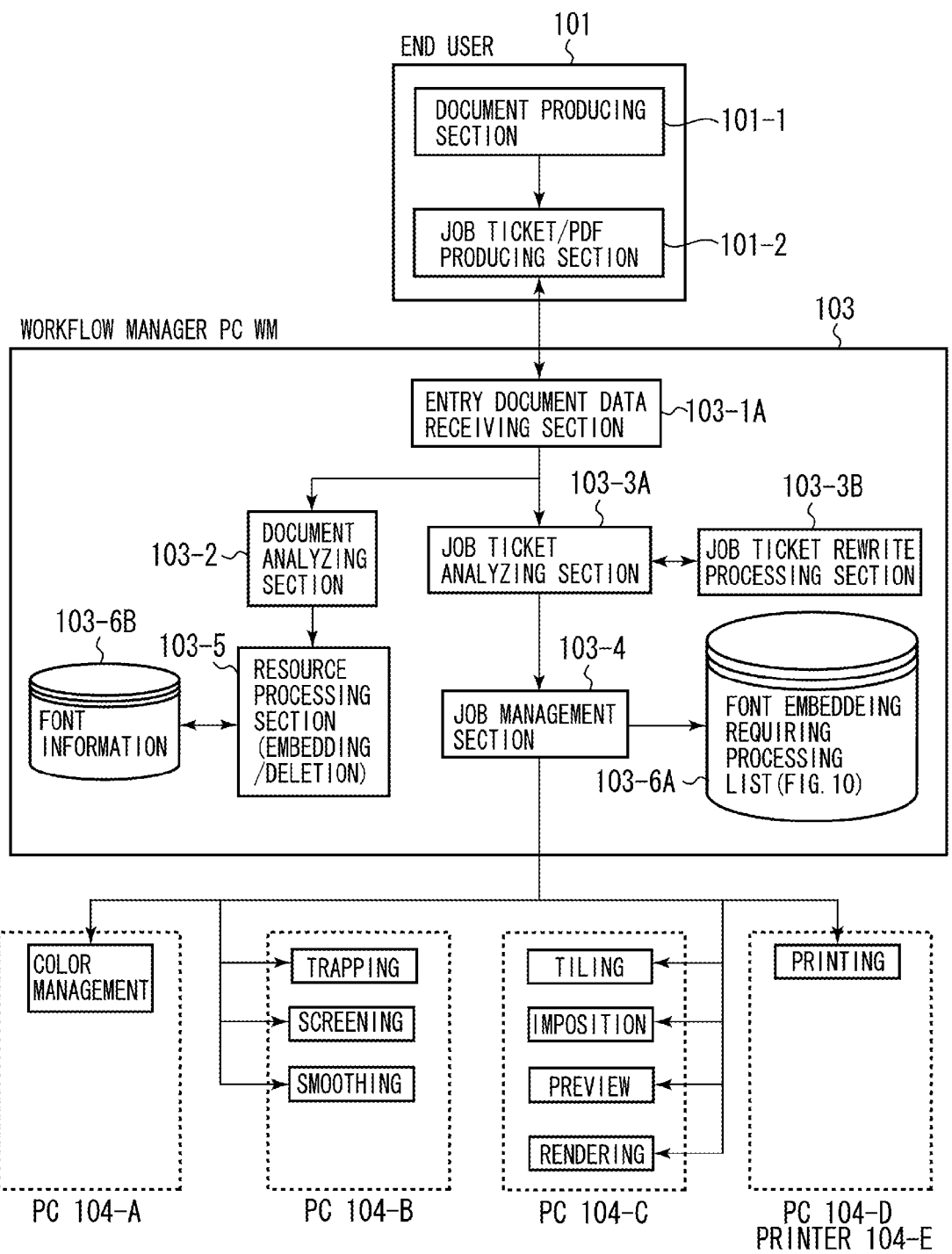
FIG. 14 is a block diagram schematically illustrating a system arrangement of the image processing system in accordance with an exemplary embodiment.

FIG. 14 is a block diagram schematically illustrating a system arrangement of the image processing system in accordance with the present exemplary embodiment. The components similar to those illustrated in FIGS. 1 and 2 are denoted by the same reference numerals. The system arrangement shown in FIG. 14 is characterized in that the function corresponding to the job creating section 102 shown in FIG. 1 is provided in an end user (client) environment 101.

The client environment 101 includes a document producing section 101-1 and a job ticket/PDF producing section 101-2. The document producing section 101-1 can be configured by a personal computer provided in the client environment 101. The document producing section 101-1 can produce an arbitrary document. The job ticket/PDF producing section 101-2 can include the function of the job creating section 102 shown in FIG. 1.

The job ticket/PDF producing section 101-2 can produce a PDF document based on the document produced from the document producing section 101-1, and can produce a job ticket instructing a processing method of the PDF document. Then, the job ticket/PDF producing section 101-2 can input the produced PDF document and the job ticket to a workflow manager (i.e., the job management apparatus) 103 (corresponding to the document entry processes 1301 and 1401 of FIG. 13B).

The workflow manager 103 includes an entry document data receiving section 103-1A involved in the data input/output section 103-1 shown in FIG. 2. The entry document data receiving section 103-1A can receive the entered PDF document and the job ticket (corresponding to the document entry processes 1301 and 1401 of FIG. 13B).

Next, the document analyzing section 103-2 analyzes font data of required characters embedded in the entered PDF document.

Furthermore, a job ticket analyzing section 103-3A, involved in the job ticket optimization processing section 103-3 shown in FIG. 2, interprets the entered job ticket. Furthermore, a job ticket rewrite processing section 103-3B adds a font embedding process to a position immediately preceding a font embedding PDF requiring process, based on the result of job ticket analysis and a font embedding requiring processing list 103-6A.

The job ticket rewrite processing section 103-3B is involved in the job ticket optimization processing section 103-3 shown in FIG. 2. The font embedding requiring processing list 103-6A is similar to that shown in FIG. 10, which is stored in the data storing section 103-6 shown in FIG. 2.

The job management section 103-4 performs the workflow control based on a rewritten job ticket.

According to the workflow control, respective image processing devices 104-A to 104-E perform the image processing. Furthermore, the resource processing section 103-5 executes a font embedding process for embedding, into the PDF document, font information 103-6B stored in the data storing section 103-6 shown in FIG. 2.

For example, according to the workflow (1) shown in FIG. 13B, the image processing device (PC A) 104-A executes the color management process 1302 applied to the entry document data received by the entry document data receiving section 103-1A. The image processing device (PC B) 1404-B executes the trapping process 1303. The image processing device (PC C) 1404-C executes the tiling process 1304 and the imposition process 1305.

The resource processing section 103-5 executes the font embedding process 1307. Furthermore, the image processing device (PC D) 1404-D and the image processing device (printer) 1404-E execute the printing process 1306. Then, the processing of this routine is terminated.

According to the workflow (2) shown in FIG. 13B, the image processing apparatus (PC B) 1404-B executes the trapping process 1402 and the smoothing process 1403 applied to the entry document data received by the entry document data receiving section 103-1A. The resource processing section 103-5 executes the font embedding process 1407.

The image processing apparatus (PC C) 1404-C executes the preview process 1404 and the rendering process 1405. Furthermore, the image processing apparatus (PC D) 1404-D and the image processing apparatus (printer) 1404-E execute the printing process 1406. Then, the processing of this routine is terminated.

As described above, when plural processes are applied to a print document in response to reception of the print document accompanied by a job ticket, the present exemplary embodiment can rewrite the job ticket, so that a resource can be embedded into the print document immediately before starting the resource requiring process.

Thus, the data size of the print document in the processes preceding a resource requiring process can be reduced. The entire processing can be performed efficiently.

Second Exemplary Embodiment

A second exemplary embodiment of the present invention will be described below.

The second exemplary embodiment is substantially similar to the above-described first exemplary embodiment in the system arrangement as well as in the software arrangement of each image processing apparatus. However, the resource processing section 103-5 of the second exemplary embodiment can perform resource deleting processing in addition to the resource embedding processing.

The second exemplary embodiment is substantially similar to the first exemplary embodiment in the processing procedure, and is differentiated only in the processing performed when all of the font data used is embedded in the original document (refer to step S502 of FIG. 6).

More specifically, the second exemplary embodiment is characterized in that the embedded resource (font format information) is once deleted from the original document and the job ticket is rewritten so that the resource information can be embedded into the original document immediately before starting the processing that requires (uses) the font format information.

According to the above-described first exemplary embodiment, when font format information of the font data used is thoroughly embedded in the original document in step S502 of FIG. 6, the processing flow proceeds to step S506 without executing the job ticket optimization processing.

The second exemplary embodiment is differentiated from the first exemplary embodiment in executing secondary job ticket optimization processing (refer to step S508 of FIG. 15) when the font format information of the font data used is thoroughly embedded in the original document.

<Exemplary Processing Procedure According to Second Exemplary Embodiment>

Next, with reference to the flowchart shown in FIG. 15, schematic processing of the job management apparatus 103 according to the second exemplary embodiment will be described.

Figure 15:
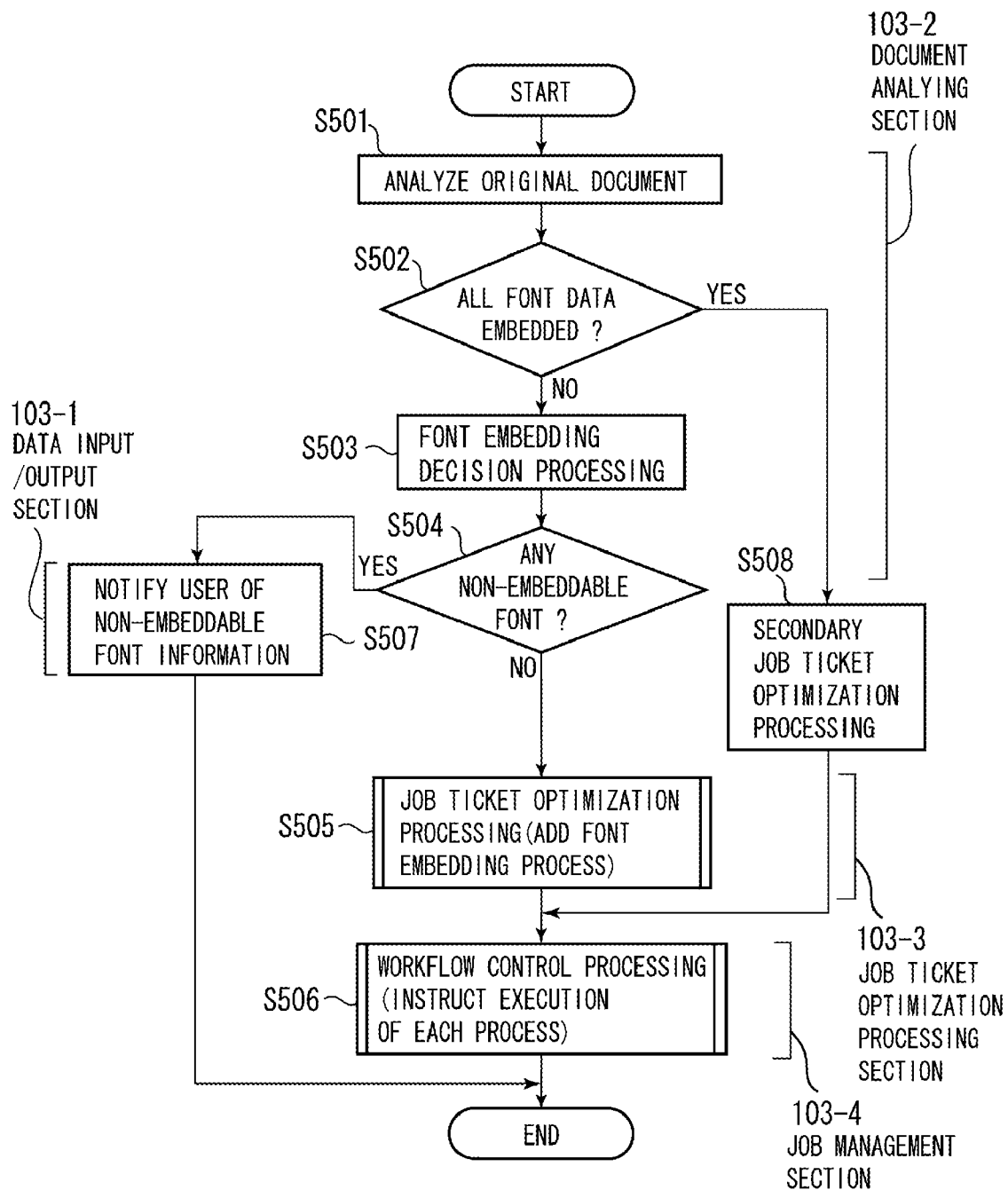
FIG. 15 is a flowchart showing an example of a fourth control processing procedure of the image processing system in accordance with an exemplary embodiment.

FIG. 15 is a flowchart showing an example of a fourth control processing procedure of the image processing system in accordance with the present exemplary embodiment.

In the flowchart, steps S501 to S504 show the processing performed by the document analyzing section 103-2. Steps S505 and S508 show the processing performed by the job ticket optimization processing section 103-3. Step S506 shows the processing performed by the job management section 103-4. Step S507 shows the processing performed by the data input/output section 103-1.

More specifically, the CPU of the job management apparatus 103 loads the program stored in the external memory into the memory and executes the program to realize the processing of steps S501 to S508. In the flowchart, the steps similar to the steps shown in FIG. 6 are denoted by the same step numbers.

In step S502, the document analyzing section 103-2 determines whether the font data used is thoroughly embedded in the original document. When the font data used is thoroughly embedded in the original document, the processing flow proceeds to step S508.

In step S508, the job ticket optimization processing section 103-3 execute the secondary job ticket optimization processing (refer to FIG. 16), and then executes the processing of step S506. The rest of the processing is similar to those shown in FIG. 6.

<Exemplary Job Ticket Optimization Processing Procedure According to Second Exemplary Embodiment>

Next, a detailed processing procedure of the secondary job ticket optimization processing (step S508) will be described with reference to the flowchart shown in FIG. 16.

Figure 16:
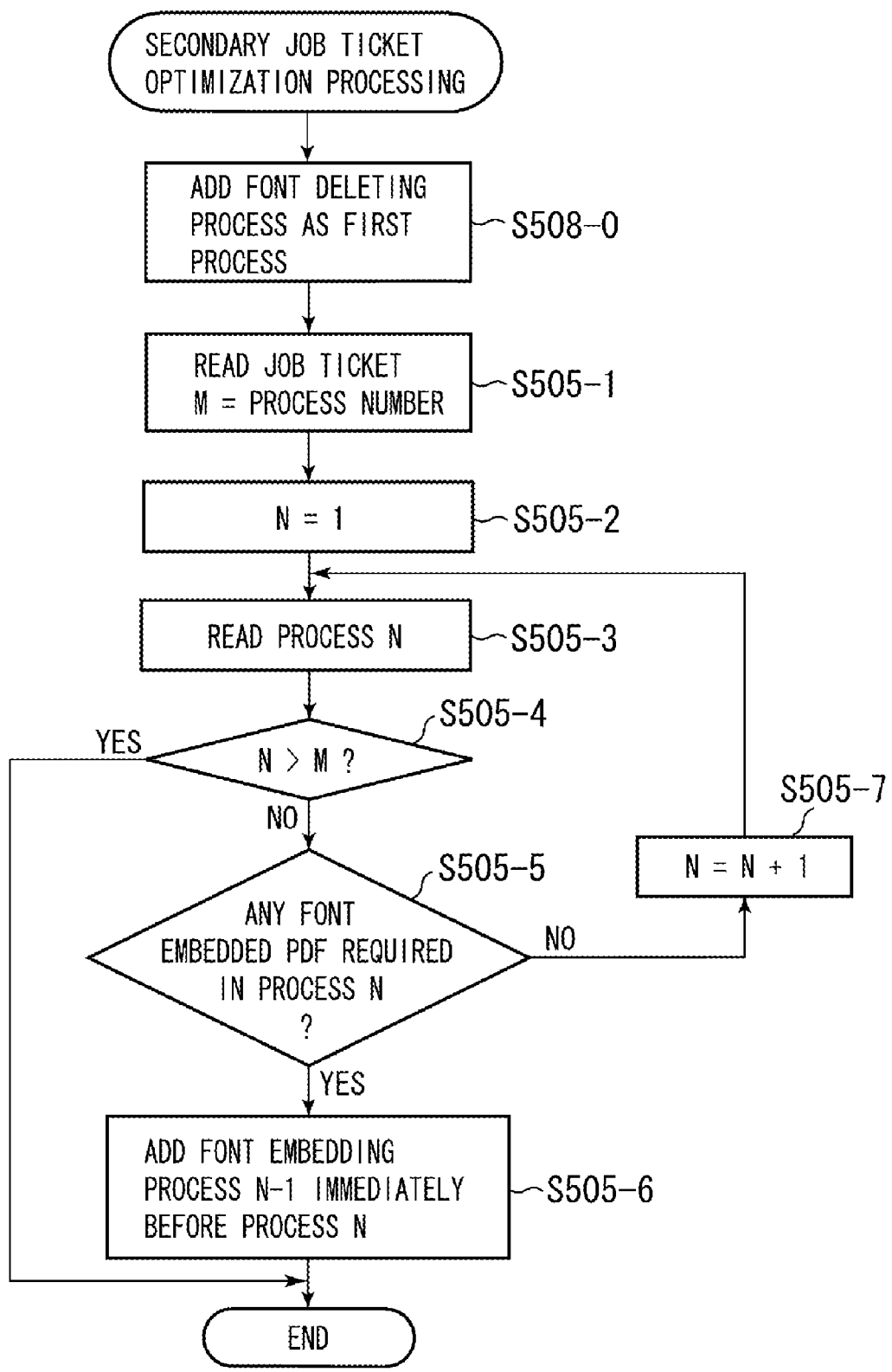
FIG. 16 is a flowchart showing an example of a fifth control processing procedure of the image processing system in accordance with an exemplary embodiment.

FIG. 16 is a flowchart showing an example of a fifth control processing procedure of the image processing system in accordance with the present exemplary embodiment, corresponding to the job ticket optimization processing of the second exemplary embodiment.

In the flowchart, steps S508-0, and S505-1 to S505-7 show the processing performed by the job ticket optimization processing section 103-3. More specifically, the CPU of the job management apparatus 103 loads the program stored in the external memory into the memory and executes the program to realize the processing of steps S508-0, and S505-1 to S505-7. In the flowchart, the steps similar to the steps shown in FIG. 9 are denoted by the same step numbers.

First, in step S508-0, the job ticket optimization processing section 103-3 reads a job ticket stored in the data storing section 103-6, and adds a font deleting process as a first process. Then, the processing flow proceeds to step S505-1. The rest of the processing is similar to those shown in FIG. 9.

With the above-described processing, for example, when the job ticket shown in FIG. 7 is entered and when the font embedding document requiring process list shown in FIG. 10 is available, the job ticket can be rewritten as shown in FIG. 17.

FIG. 17 is a view showing an example of a job ticket rewritten by the job ticket optimization processing section 103-3 in step S508-0 of FIG. 16.

The job ticket shown in FIG. 17 includes a font deleting process 1701 (i.e., the second to eighth lines of FIG. 17) and a font embedding process 1702 (i.e., the 33rd to 38th lines of FIG. 17) in addition to the contents of the job ticket shown in FIG. 7.

As described above, when a resource embedded document is entered, the second exemplary embodiment can delete the resource from the entered original document. Thus, the data size of the PDF document in the processes preceding a font embedding PDF requiring process can be reduced. The burden placed on each image processing apparatus can be reduced. Accordingly, the processing time can be reduced.

Next, the resource processing according to the second exemplary embodiment will be described with reference to FIG. 18.

Figure 18:
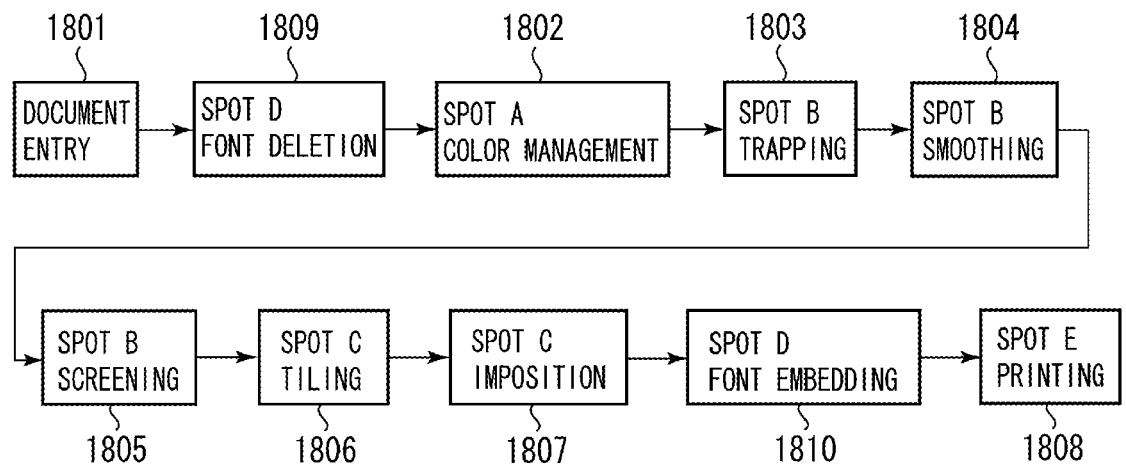
FIG. 18 is a view schematically showing font embedding processing in accordance with a second exemplary embodiment.

FIG. 18 is a view schematically showing font embedding processing in accordance with the second exemplary embodiment.

First, the second exemplary embodiment deletes the resource from an entered font embedded PDF document. Then, the second exemplary embodiment rewrites the job ticket so that the resource can be embedded into the document immediately before starting the resource requiring process in controlling plural processes applied to the print document.

According to the example shown in FIG. 18, the second exemplary embodiment executes a font deleting process 1809 immediately after finishing a document entry process 1801 and executes a font embedding process 1810 immediately before starting a font embedding PDF requiring process (i.e., a printing process 1808). Therefore, the processes 1802 to 1807 between the font deleting process and the font embedding process are not required to handle the font embedded PDF document.

As described above, the second exemplary embodiment can delete the embedded font information immediately when a font embedding PDF document is entered. Thus, the data size of the PDF document in the processes preceding a font embedding PDF requiring process can be reduced. Thus, the burden placed on each image processing apparatus can be reduced. Accordingly, the processing time can be reduced.

According to a modified embodiment, the job management apparatus 103 and respective image processing devices 104-A to 104-D can be located at different spots so as to be connected via the Internet.

It is now supposed that the image processing device (PC A) 104-A is provided at spot A, the image processing device (PC B) 104-B is provided at spot B, and the image processing device (PC C) 104-C is provided at spot C. Furthermore, the job management apparatus 103 is provided at spot D. The image processing device (PC D) 104-D and the printer 104-E are provided at spot E.

According to the above-described arrangement, the data is entered at the spot D (refer to a process 1801). At spot D, the job management apparatus 103 performs the font deleting process 1809 applied to the received entry document data. Then, the data is transferred to the spot A. At spot A, the image processing device (PC A) 1404-A performs the color management process 1802. Then, the data is transferred to the spot B. At spot B, the image processing device (PC B) 1404-B performs a trapping process 1803, a smoothing process 1804, and a screening process 1805. Subsequently, the data is transferred to the spot C. At spot C, the image processing device (PC C) 1404-C performs a tiling process 1806 and an imposition process 1807.

Then, the data is again transferred to the spot D. At spot D, the job management apparatus 103 performs the font embedding process 1810 applied to the received data. After that, the data is transferred to the spot E. At spot E, the image processing device (PC D) 1404-D and the image processing device (printer) 1404-E perform a printing process 1808.

As understood from the above description, when a large number of processes are required and the processing is performed at plural spots, the amount of data to be transferred from a spot to another spot tends to increase.

In such a case, the present exemplary embodiment can delete the embedded resource from an entered resource embedded document immediately after such a document is entered, so as to reduce the document size in the processes preceding a resource embedded document requiring process. Accordingly, the time required for transferring the data between respective spots can be reduced. Thus, the second exemplary embodiment can bring the effects when a large number of processes are required and the processing is performed at plural spots.

In each of the above-described exemplary embodiments, the job ticket optimization processing section 103-3 is capable of rewriting a job ticket so that a resource can be embedded immediately before starting a resource requiring process, or capable of deleting the resource at the leading process. However, it is possible to configure the job management section 103-4 so as to execute a similar control without rewriting the job ticket.

More specifically, when an entered print document includes no embedded resource, the job management section 103-4 causes the resource processing section 103-5 to embed a resource into the print document, immediately before instructing the image processing apparatus 104 to execute a resource requiring process. After accomplishing the resource embedding processing, the job management section 103-4 instructs the image processing apparatus 104 to execute the resource requiring process. Furthermore, when an entered print document includes an embedded resource, the job management section 103-4 causes the resource processing section 103-5 to delete the resource involved in the print document.

Even in such an arrangement, the document size in the processes preceding the resource embedded document requiring process can be reduced. The entire processing can be performed efficiently.

Moreover, in some cases, it may be difficult to add the font embedding process so as to be executed immediately before starting the font requiring process. In such cases, the above-described exemplary embodiments can be modified so as to add the font embedding process as close as possible to the font requiring process.

Also, practical data and contents shown in FIGS. 7, 8, 10, 11, and 17 can be changed adequately depending on the use or intent.

The present invention can be embodied as a system, an apparatus, a method, a program or a storage medium. For example, the present invention can be applied to a system including plural devices or can be applied to a single device.

Additionally, various data processing programs readable by the job management apparatus 103 of the image processing system according to the exemplary embodiments can be stored in a storage medium.

Figure 19:
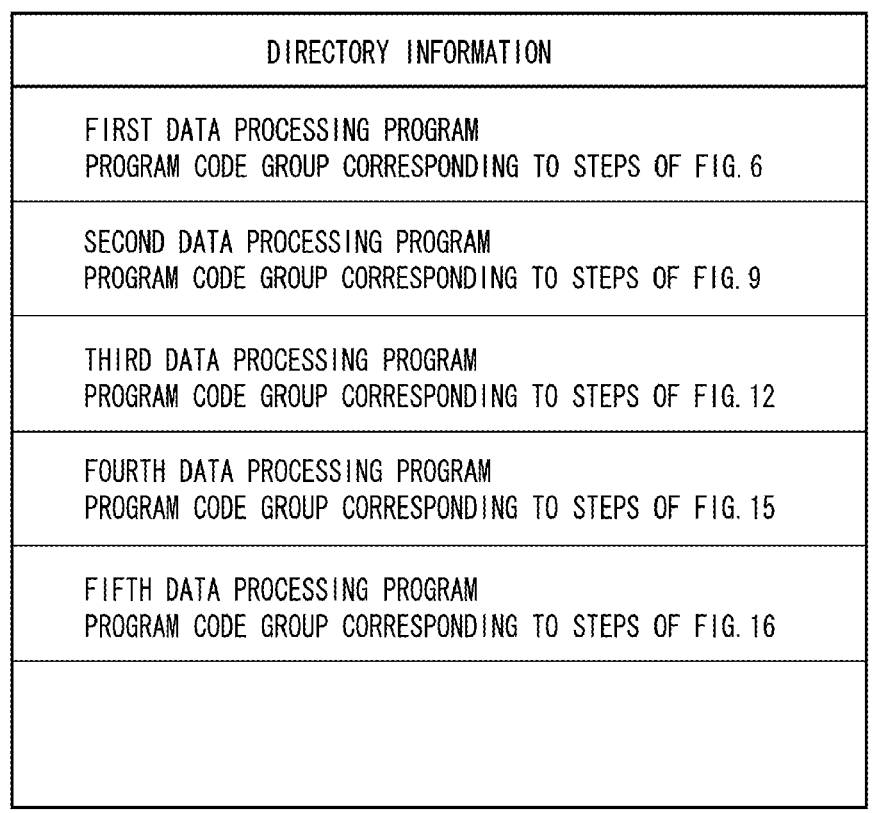
FIG. 19 is a view showing a memory map of a storage medium (recording medium) capable of storing various data processing programs, readable by the job management apparatus of the image processing system according to an exemplary embodiment.

FIG. 19 is a view showing a memory map of a storage medium (recording medium) capable of storing various data processing programs, readable by the job management apparatus 103 of the image processing system according to each exemplary embodiment.

Although not shown in the drawing, the storage medium can also store the information relating to management of program(s), such as version information and creator name, as well as the information relating to the OS that reads the program(s), such as icons discriminating the program(s).

Directories of the storage medium can manage the data belonging to various programs. Furthermore, the storage medium may store a program required for installing various programs on a computer as well as a program required for extracting compressed programs.

A host computer, when the programs are installable from an external storage device, can execute the processing of the exemplary embodiments shown in the flowcharts of FIGS. 6, 9, 12, 15, and 16.

In such a case, the programs and related information can be supplied to an output apparatus using a storage medium (e.g., a CD-ROM, a flash memory, or a flexible disk (FD)), via a network from an external storage medium.

Furthermore, software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout program.

In this case, the program code read out from the storage medium can realize the functions of the exemplary embodiments. The equivalents of programs can be used if they possess comparable functions.

Accordingly, when the functions or processes of the exemplary embodiments are realized by a computer, program code installed in the computer and a recording medium storing the program are used to implement the present invention.

In this case, the type of program can be any one of object code, interpreter program, and OS script data.

A recording medium supplying the program can be selected from any one of a flexible disk, a hard disk, an optical disk, a magneto-optical disk, an MO, a CD-ROM, a CD-R, a CD-RW, a magnetic tape, a nonvolatile memory card, a ROM, and a DVD (DVD-ROM, DVD-R).

In other words, the present invention encompasses a computer program that can realize the functions or processes of the exemplary embodiments or any recording medium that can store the program.

The method for supplying the program includes accessing a home page on the Internet using the browsing function of a client computer, when the home page allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different home pages. Namely, the present invention encompasses WWW servers or FTP servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiment can be realized by a computer that executes the programs, but also an operating system (OS) running on the computer can execute part or all of the actual processing based on instructions of the programs.

Furthermore, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing so that the functions of the above-described exemplary embodiments can be realized.

The present invention can be applied to a system including plural devices or can be applied to a single apparatus. Moreover, the present invention can be realized by supplying the program(s) to a system or an apparatus. In this case, the system or the apparatus can read the software program relating to the present invention from a storage medium.

According to the exemplary embodiments of the present invention, the data size of a document in the processes preceding a resource requiring process can be reduced. The entire processing can be performed efficiently.

Moreover, even when a resource embedded print document is received, the data size of the print document in the processes preceding a resource requiring process can be reduced. The entire processing can be performed efficiently.

When the present invention is applied to the above-described recording medium, the recording medium stores the program code corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-283295 filed Sep. 29, 2005, which is hereby incorporated by reference herein in its entirety.

What is claimed is:

1. A printing workflow system configured to execute print processing based on a print document and a print instruction that instructs a printing workflow including plural processes applied to the print document, the printing workflow system comprising:
    a determining unit configured to determine whether resource information is embedded in the print document;
    an identifying unit configured to identify a process that initially uses the resource information embedded in the print document, among the plural processes instructed by the print instruction by reading each process among the plural processes and by determining each process that uses the resource information embedded in the print document; and
    a rewriting unit configured to rewrite the print instruction when the determining unit determines that the resource information is embedded in the print document, so as to include a first process to delete the resource information from the print document before execution of the plural processes and to include a second process to embed the resource information, which is deleted at the first process, in the print document just before execution of the process identified by the identifying unit,
    wherein the print instruction to instruct the printing workflow is optimized as a result of the rewriting by the rewriting unit.

2. The printing workflow system according to claim 1, wherein the resource information is font format information.

3. A method in a printing workflow system configured to execute print processing based on a print document and a print instruction that instructs a printing workflow including plural processes applied to the print document, the method comprising:
    determining whether information is embedded in the print document;
    identifying a process that initially uses resource information embedded in the print document, among the plural processes instructed by the print instruction by reading each process among the plural processes and by determining each process that uses the resource information embedded in the print document; and
    rewriting the print instruction when a determination is made that the resource information is embedded in the print document, so as to include a first process to delete the resource information from the print document before execution of the plural processes and to include a second process to embed the resource information, which is deleted at the first process, in the print document just before execution of the process identified in the identifying step,
    wherein the print instruction to instruct the printing workflow is optimized as a result of the rewriting.

4. The method according to claim 3, wherein the resource information is font format information.

5. The printing workflow system according to claim 1, wherein the process identified by the identifying unit includes a preview process or a printing process.

6. The method according to claim 3, wherein the process identified in the identifying step includes a preview process of a printing process.

7. A non-transitory computer-readable storage medium, storing a computer-executable process, the computer-executable process causing a computer to perform a method in a printing workflow system configured to execute print processing based on a print document and a print instruction that instructs a printing workflow including plural processes applied to the print document, the method comprising:
    determining whether information is embedded in the print document;
    identifying a process that initially uses resource information embedded in the print document, among the plural processes instructed by the print instruction by reading each process among the plural processes and by determining each process that uses the resource information embedded in the print document; and
    rewriting the print instruction when a determination is made that the resource information is embedded in the print document, so as to include a first process to delete the resource information from the print document before the plural processes and to include a second process to embed the resource information which is deleted at the first process in the print document just before the process identified in the identifying step,
    wherein the print instruction to instruct the printing workflow is optimized as a result of the rewriting.

* * * * *